INVENTOR.
William Joseph Tolson
BY
ATTORNEY

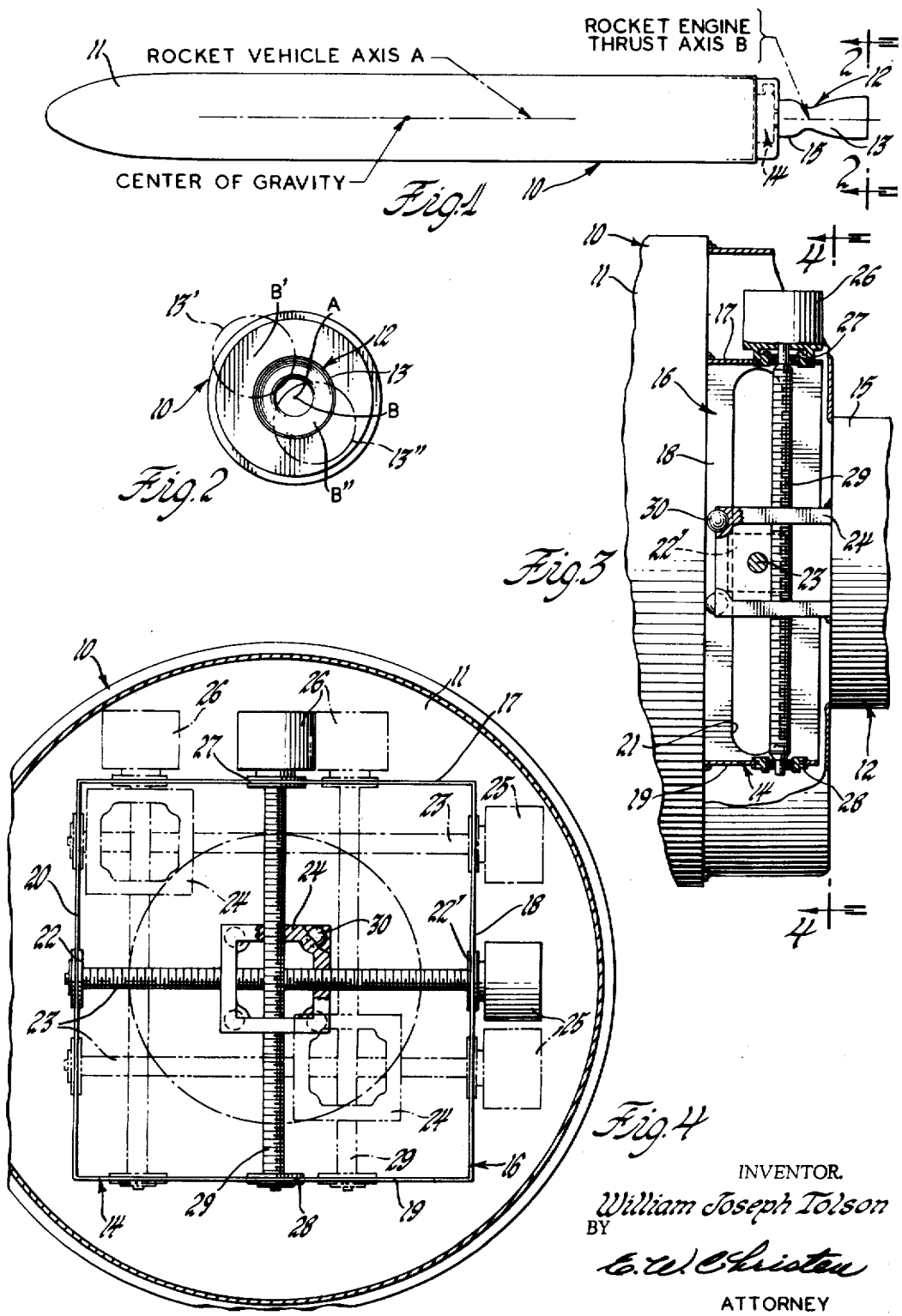

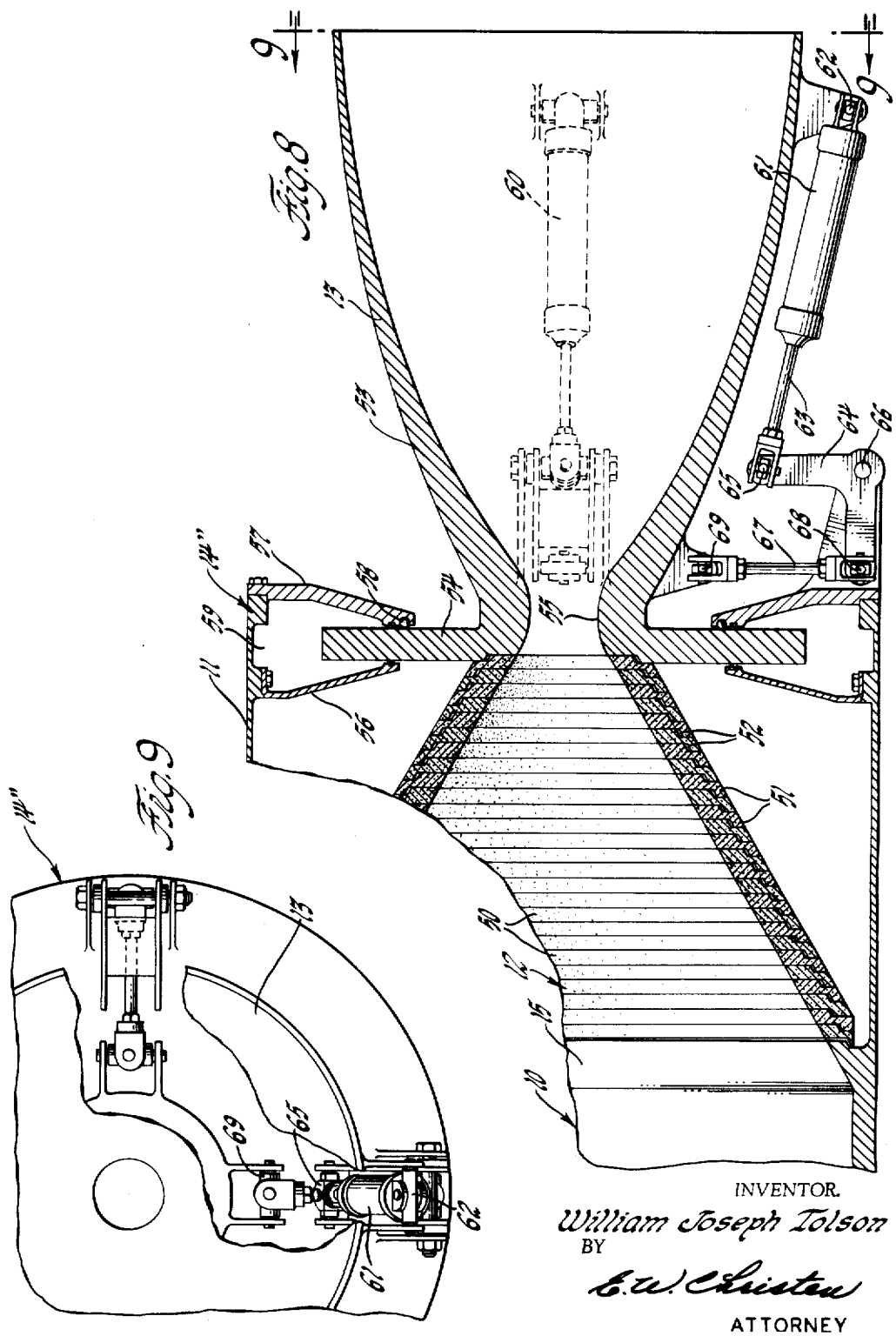

:::

United States Patent Office 3,200,587
Patented Aug. 17, 1965

3,200,587
ROCKET VEHICLE ATTITUDE CONTROL
William Joseph Tolson, Indianapolis, Ind., assignor to General Motors Corporation, Detroit, Mich., a corporation of Delaware
Filed Sept. 15, 1961, Ser. No. 138,481
5 Claims. (Cl. 60—35.55)

This invention relates to rocket vehicles and more particularly to attitude controlling means therefor.

The usual rocket vehicle is an elongated cylindrical body which includes a rocket engine at the rear end to provide thrust, forwardly located fuel tanks, control systems and other items such as a payload, a detachable space capsule or a later stage rocket, and these components are arranged so that the center of gravity lies on the central axis of the vehicle. A rocket engine provides a thrust axis that is determined by the exhaust nozzle, and the conventional means of accomplishing directional changes is to swivel or tilt the exhaust nozzle so that the thrust axis is angled with respect to the vehicle axis or to move vanes in the nozzle exhaust to deflect the thrust axis. The aforesaid means of controlling attitude have an adverse effect on the efficiency of the engine during steering because they change the exhaust path from the combustion chamber from a straight one to a turbulent one.

The object of the invention is to provide an attitude control that will maintain engine thrust efficiency during steering as well as during stable flight conditions. In carrying out the invention, an entirely different concept of directional control was developed and this concept consists generically in shifting the nozzle bodily of the vehicle in such a manner that the thrust axis is moved from a position where it is coincidental with the central axis of the vehicle to various positions where it is laterally displaced from the central axis. The movement of the thrust axis from the center of gravity or vehicle axis applies torque to the vehicle to effect directional change.

In the drawings:

FIGURE 1 is a side elevation of a rocket vehicle employing the invention;

FIGURE 2 is an end elevation of the rocket nozzle taken on the plane indicated by the line 2—2 of FIGURE 1;

FIGURE 3 is an enlarged view, partially broken away, of the attitude control means which connects the rocket nozzle to the remainder of the vehicle for movement to any parallel lateral positon with respect to the vehicle axis;

FIGURE 4 is a sectional view taken on the plane indicated by the line 4—4 of FIGURE 3;

FIGURE 8 is a sectional view of yet another attitude control means utilizing the inventive concept; and FIGURE 9 is an end view of the nozzle of FIGURE 8, partially broken away, and taken on the plane indicated by the line 9—9 of FIGURE 8.

Figures 5, 6:
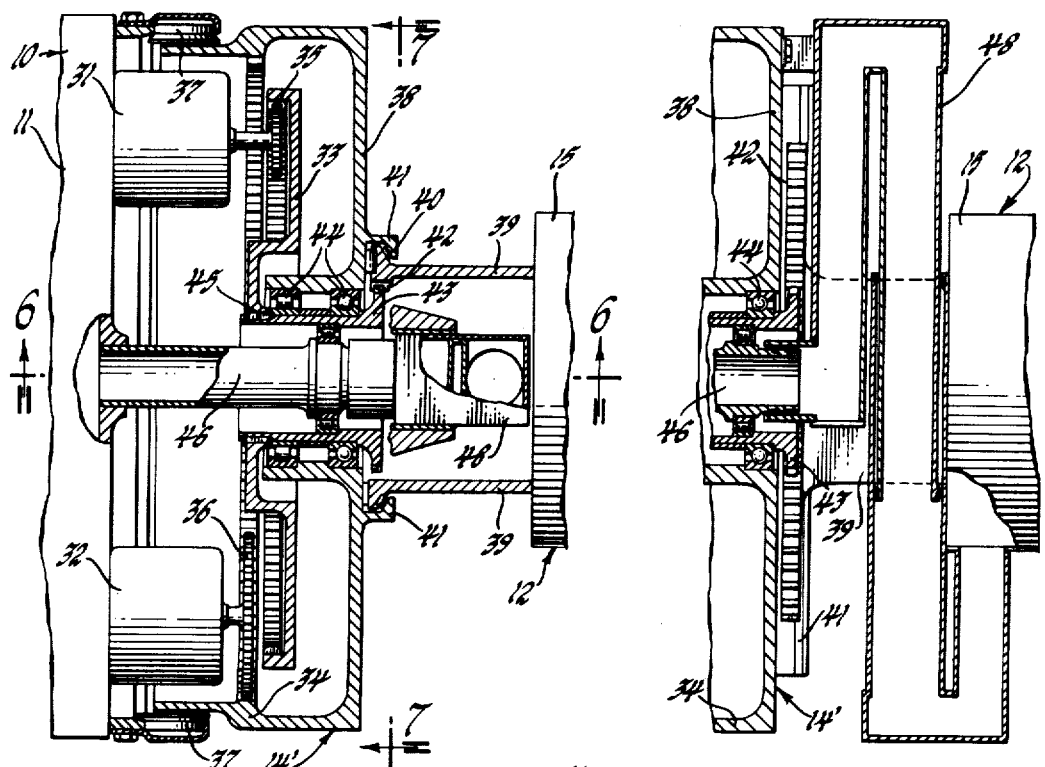
FIGURE 5 is of a view similar to that of FIGURE 3 of an alternative form of attitude control means.
FIGURE 6 is a sectional view taken on the plane indicated by the line 6—6 of FIGURE 5.

Referring to the drawings, the vehicle 10, which may be a guided missile, has the usual elongated cylindrical body 11 and rocket engine 12. The fuel tanks, control systems, and a payload are housed in the body 11 and the engine 12 has an exhaust nozzle portion 13 which is movably supported on the rear end of the body 11 by an actuator 14. The engine 12 has a combustion chamber 15 which may be mounted with the exhaust nozzle 13 on the actuator 14, as in FIGURE 1, or it may be mounted on the body 11, as in the alternative form of the invention shown in FIGURES 8 and 9. All of the vehicle components other than the attitude control means are conventional and need not be described in detail.

From FIGURES 1 and 2 it is seen that the rocket vehicle has a central axis A and that the rocket engine has a thrust axis B. The center of gravity of the vehicle falls on the axis A and will shift lengthwise therealong as fuel is consumed. The nozzle thrust axis B can be moved from a position where it is coincidental with the vehicle axis A to various positions laterally of the vehicle axis and parallel thereto as indicated by the dot-dash nozzle positions 13′ and 13″ of FIGURE 2. Such movements of the nozzle displace the thrust axis from the center of gravity of the vehicle, and the resultant torque will turn the vehicle until the nozzle is moved to realign the thrust axis with the vehicle axis. For example, if the nozzle 13 of FIGURE 1 is moved down, the resultant clockwise torque will effect an upward pitch in the vehicle. Similarly a movement of the nozzle 13 to one side will effect a torque that will cause the vehicle to move in a yawing direction.

Various mechanisms may be employed for the attitude control means 14 as long as they are capable of bodily shifting the nozzle in any direction laterally of the vehicle axis. The control 14 of FIGURES 3 and 4 comprises a rectangular frame 16 secured to the vehicle body 11 by walls 17, 18, 19 and 20 which are each slotted, as at 21. To afford control in the yaw direction, the walls 18 and 20 mount slidable guide shoes 22 and 22′ which rotatably mount a screw shaft 23. The screw shaft 23 is threaded to a carrier 24 which is connected to the nozzle 13. A suitable actuating motor 25 is connected to the screw shaft 23 and energized in either direction to shift the carrier 24 to the right or left, as seen by the dot-dash positions of FIGURE 4.

Movement in the pitch direction is accomplished by a reversible actuator 26 which is carried by slidable guide shoes 27 and 28, mounted in slots 21 in the walls 17 and 19. A pitch screw shaft 29 is also threaded to the carrier 24 to raise and lower the same, as seen by the dot-dash positions of FIGURE 4, on energization of the actuator 26. Anti-friction rollers 30 are provided between the body 11 and the nozzle carrier 24. Conventional control systems may be used to power the actuators 25 and 26 in any direction both separately and simultaneously, and the nozzle thrust axis can thus be positioned at various radial distances from the vehicle axis and at any peripheral position. Referring to FIGURE 1, it is seen that the combustion chamber 15 discharges directly to the convergent-divergent nozzle 13. Now in the usual control, the nozzle 13 would swivel with respect to the combustion chamber 15 or would have vanes therein to deflect the exhaust stream. The straight flow path through combustion chamber and nozzle would then be lost with resultant inefficiencies. Applicant's arrangement avoids this as the flow path through combustion chamber and nozzle is not deflected.

Figure 7:
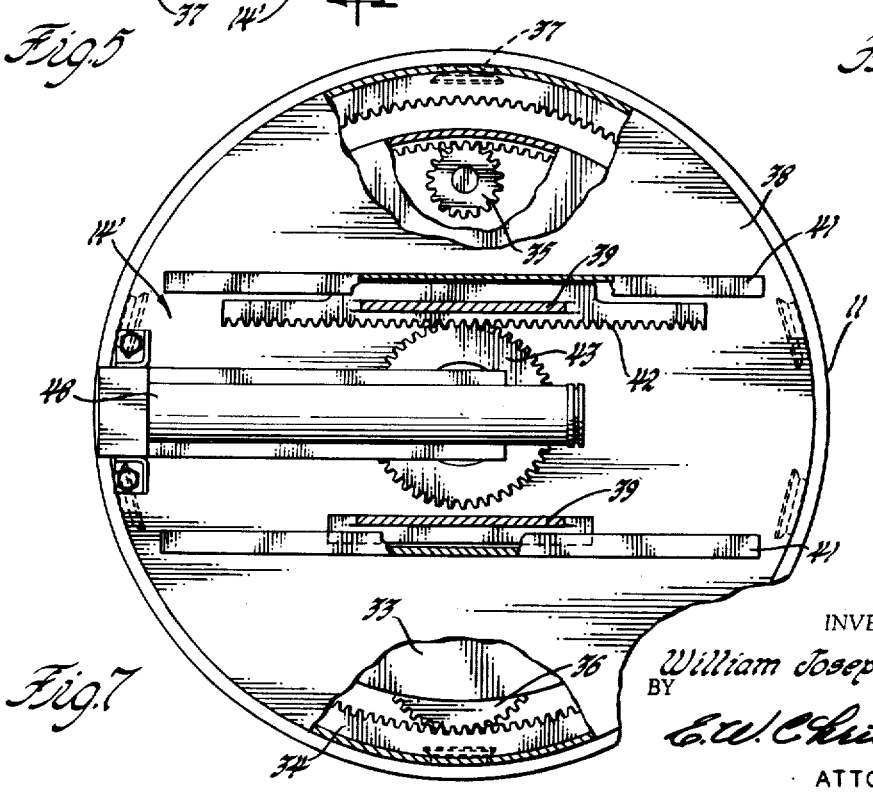
FIGURE 7 is a sectional view, partially broken away, and taken on the plane indicated by the line 7—7 of FIGURE 5.

Referring now to FIGURES 5 to 7 for a modified attitude control 14′, a pair of reversible actuating motors 31 and 32 are employed to rotate ring gears 33 and 34 by means of pinions 35 and 36. The ring gear 34 is rotatably carried on the rocket body 11 by a plurality of peripheral bearings 37 and forms the supporting face 38 for the rocket nozzle 13. The rocket engine 12 has a pair of supporting rails 39 which are slidably mounted by roller bearings 40 in ways 41 formed on the supporting face 38. The ways 41 carry the rocket 12 but per-

:::

mit it to slide sideways as seen in FIGURE 7. A rack 42 is located on one of the supporting rails 39 and meshes with a pinion 43 which is carried by bearings 44 in the ring gear 34. The pinion 43 is splined at 45 to the ring gear 33 and will accordingly rotate when the motor 31 is energized. Energization of the motor 31 will thus drive the rack 42 and shift the rocket engine 12 in a diametral direction set by the tracks 41. The nozzle thrust axis is thus displaced laterally of the vehicle axis.

Clockwise positioning of the nozzle thrust axis with respect to the vehicle axis is afforded by energizing the motor 32 as this, by way of the pinion 36, turns the carrier ring gear 34 to rotate the rocket nozzle 13. The motors 31 and 32 may be run in any direction both separately and simultaneously by the use of conventional control systems to orient the nozzle laterally of the vehicle axis and provide directional control. In the illustrated embodiment of FIGURES 5 through 7, the combustion chamber portion 15 of the engine 12 is supplied with fuel by a telescopic conduit 48 and a conduit 45 which passes through the center of pinion 43.

Referring to FIGURES 8 and 9, a modified attitude control 14" is shown, and in this instance the combustion chamber 15 of the rocket engine 12 is maintained stationary with the main body 11 and only the nozzle 13 is moved laterally of the vehicle axis. The entrance portion of the nozzle 13 consists of a multitude of carbon rings 50 which are stacked to provide a convergent section and are radially positioned by peripheral flanges 51 there being predetermined clearance spaces 52 between the flanges and the inner peripheries of adjacent rings so that the rings can accommodate the lateral shifting of the nozzle outlet portion 53. The nozzle outlet 53 is divergent and has an annular flange 54 that extends from the nozzle throat 55. The annular flange 54 extends between a pair of plates 56 and 57 which permit the nozzle outlet to move radially but restrain it against axial movement. Suitable bearings 58 may be provided to reduce friction between the annular flange 54 and the plates 56 and 57. A cavity 59 is formed between the plates 56 and 57 and may be pressurized for cooling purposes and to block leakage of the combustion gases.

The nozzle outlet 53 is oriented by a pair of actuators 60 and 61 which may be pressure operated. The actuator 61 provides vertical movement for the nozzle outlet for control of the rocket vehicle in pitch direction while the actuator 60 provides horizontal movement for control in the yaw direction. The linkage arrangement that connects the actuator 61 to the nozzle outlet 53 and vehicle body 11 is identical to that connecting the actuator 60 so only one linkage need be described in detail. The actuator 61 is connected to the nozzle outlet 53 by a universal joint 62 and the reciprocal portion 63 of the actuator is connected to a bell crank 64 by a universal joint 65. The bell crank pivots at 66 to the vehicle body 11 and is connected to the nozzle outlet by means of an intermediate link 67 and universal joints 68 and 69. The universal joints 62, 65, 68 and 69 are not used in their usual fashion, that is, to accommodate an annular displacement between rotating shafts, but are provided to accommodate the horizontal movement caused by the other actuator 60. When the actuator 61 is extended, the bell crank 64 will rotate and pull down the nozzle outlet 53 through the link 67. If the actuator 60 is likewise extended, the nozzle outlet 53 will shift to the right, as viewed from the rear end of the nozzle, and the universal joints 68 and 69 will let the link 67 turn in clockwise direction and the universal joints 62 and 65 will let the actuator 61 turn in counter-clockwise direction. Conventional control systems may again be used to power the actuators 60 and 61 in any direction, both separately and simultaneously, so that the nozzle thrust axis may be located laterally of the vehicle axis in any desired parallel position.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. In a rocket vehicle of the type comprising a body including a rocket engine and fuel supply, said engine having a nozzle defining a thrust axis for said vehicle, said body having a central axis locating the center of gravity of said body, the improvement comprising an attitude control for said vehicle comprising motored means for movably positioning said nozzle on said body from a position where said nozzle and body axes are coincidental to various positions where said nozzle axis is laterally displaced in parallel relation from said body axis.

2. Apparatus in accordance with claim 1 wherein said motored means includes first means to move said nozzle axis radially of said body axis along one diameter and second means to move said nozzle axis radially of said body axis along another diameter that is perpendicular to said one diameter.

3. Apparatus in accordance with claim 1 wherein said motored means includes first means to move said nozzle axis radially of said body axis along one diameter and second means to move said nozzle axis around said body axis.

4. Apparatus in accordance with claim 1 wherein said motored means includes first means to move said nozzle axis away from said body axis in pitch direction and second means to move said nozzle axis away from said body axis in yaw direction.

5. Apparatus in accordance with claim 1 wherein said nozzle has an inlet portion and an outlet portion, said motored means being connected to said outlet portion and said inlet portion comprising a flexible coupling between said outlet portion and the remainder of said engine.

No references cited.

SAMUEL LEVINE, *Primary Examiner.*

ABRAM BLUM, *Examiner.*